United States Patent
Wu et al.

(10) Patent No.: US 9,833,942 B2
(45) Date of Patent: *Dec. 5, 2017

(54) METHOD TO CREATE VACUUM INSULATED CABINETS FOR REFRIGERATORS

(71) Applicant: WHIRLPOOL CORPORATION, Benton Harbor, MI (US)

(72) Inventors: Guolian Wu, St. Joseph, MI (US); Nihat Cur, St. Joseph, MI (US); Jurgen Pannock, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,895

(22) Filed: Oct. 5, 2016

(65) Prior Publication Data

US 2017/0021554 A1 Jan. 26, 2017

Related U.S. Application Data

(63) Continuation of application No. 14/962,587, filed on Dec. 8, 2015, now Pat. No. 9,463,917, which is a (Continued)

(51) Int. Cl.
*B29C 51/02* (2006.01)
*B29C 51/06* (2006.01)
(Continued)

(52) U.S. Cl.
CPC ............. *B29C 51/02* (2013.01); *B29C 51/06* (2013.01); *B29C 51/082* (2013.01);
(Continued)

(58) Field of Classification Search
None
See application file for complete search history.

(56) References Cited

U.S. PATENT DOCUMENTS 948,541 A 2/1910 Coleman
1,275,511 A 8/1918 Welch
(Continued)

FOREIGN PATENT DOCUMENTS

CA 1320631 7/1993
CA 2259665 A1 1/1998
(Continued)

OTHER PUBLICATIONS

BASF, "Balindur™ Solutions for fixing Vaccum Insulated Panels," web page, 4 pages, date unknown, http://performance-materials.basf.us/products/view/family/balindur, at least as early as Dec. 21, 2015.
(Continued)

*Primary Examiner* — Ryan Ochylski
(74) *Attorney, Agent, or Firm* — Price Heneveld LLP

(57) ABSTRACT

A method of forming a vacuum insulated refrigerator cabinet, the method comprising providing first and second sheets of material. The first sheet of material is thermoformed over a first forming tool forming a first intermediate structure. The first intermediate structure is then thermoformed over a second forming mold to create a second intermediate structure. The second sheet of material is then sealing connected with the second intermediate structure forming an annular space. A vacuum is created in the annular space creating a vacuum insulated cabinet.

20 Claims, 3 Drawing Sheets

Related U.S. Application Data continuation of application No. 13/833,685, filed on Mar. 15, 2013, now Pat. No. 9,221,210.

(60) Provisional application No. 61/622,821, filed on Apr. 11, 2012.

(51) Int. Cl.

| | | |
|---|---|---|
| *B29C 51/08* | (2006.01) | |
| *F25D 23/06* | (2006.01) | |
| *B65D 81/38* | (2006.01) | |
| B29L 31/00 | (2006.01) | |
| B29K 101/12 | (2006.01) | |
| B29K 105/04 | (2006.01) | |

(52) U.S. Cl.
CPC ....... *B65D 81/3806* (2013.01); *F25D 23/064* (2013.01); *F25D 23/065* (2013.01); *B29C 2791/001* (2013.01); *B29K 2101/12* (2013.01); *B29K 2105/04* (2013.01); *B29K 2995/0067* (2013.01); *B29L 2031/7622* (2013.01); *F25D 2201/1262* (2013.01); *F25D 2201/14* (2013.01)

(56) References Cited

U.S. PATENT DOCUMENTS

| | | |
|---|---|---|
| 1,849,369 A | 3/1932 | Frost |
| 2,108,212 A | 2/1938 | Schellens |
| 2,128,336 A | 8/1938 | Torstensson |
| 2,164,143 A | 6/1939 | Munters |
| 2,318,744 A | 5/1943 | Brown |
| 2,356,827 A | 8/1944 | Coss et al. |
| 2,432,042 A | 12/1947 | Richard |
| 2,439,602 A | 4/1948 | Heritage |
| 2,439,603 A | 4/1948 | Heritage |
| 2,538,780 A | 1/1951 | Hazard |
| 2,559,356 A | 7/1951 | Hedges |
| 2,729,863 A | 1/1956 | Kurtz |
| 2,768,046 A | 10/1956 | Evans |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Costantini et al. |
| 3,137,900 A | 6/1964 | Carbary |
| 3,218,111 A | 11/1965 | Steiner |
| 3,258,883 A | 7/1966 | Campanaro et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,635,536 A | 1/1972 | Lackey et al. |
| 3,688,384 A | 9/1972 | Mizushima et al. |
| 3,868,829 A | 3/1975 | Mann et al. |
| 3,875,683 A | 4/1975 | Waters |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherburn |
| 4,242,241 A | 12/1980 | Rosen et al. |
| 4,303,732 A | 12/1981 | Torobin |
| 4,325,734 A | 4/1982 | Burrage et al. |
| 4,332,429 A | 6/1982 | Frick et al. |
| 4,396,362 A | 8/1983 | Thompson et al. |
| 4,417,382 A | 11/1983 | Schilf |
| 4,492,368 A | 1/1985 | DeLeeuw et al. |
| 4,529,368 A | 7/1985 | Makansi |
| 4,548,196 A | 10/1985 | Torobin |
| 4,660,271 A | 4/1987 | Lenhardt |
| 4,671,909 A | 6/1987 | Torobin |
| 4,671,985 A | 6/1987 | Rodrigues et al. |
| 4,745,015 A | 5/1988 | Cheng et al. |
| 4,777,154 A | 10/1988 | Torobin |
| 4,805,293 A | 2/1989 | Buchser |
| 4,917,841 A | 4/1990 | Jenkins |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,094,899 A | 3/1992 | Rusek, Jr. |
| 5,118,174 A | 6/1992 | Benford et al. |
| 5,157,893 A | 10/1992 | Benson et al. |
| 5,168,674 A | 12/1992 | Molthen |
| 5,175,975 A | 1/1993 | Benson et al. |
| 5,212,143 A | 5/1993 | Torobin |
| 5,221,136 A | 6/1993 | Hauck et al. |
| 5,231,811 A | 8/1993 | Andrepont et al. |
| 5,248,196 A | 9/1993 | Lynn et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,500,305 A | 3/1996 | Bridges et al. |
| 5,505,810 A | 4/1996 | Kirby et al. |
| 5,507,999 A | 4/1996 | Copsey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,562,154 A | 10/1996 | Benson et al. |
| 5,586,680 A | 12/1996 | Dellby et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,716,581 A | 2/1998 | Tirrell et al. |
| 5,792,801 A | 8/1998 | Tsuda et al. |
| 5,813,454 A | 9/1998 | Potter |
| 5,827,385 A | 10/1998 | Meyer et al. |
| 5,843,353 A | 12/1998 | Devos et al. |
| 5,866,228 A | 2/1999 | Awata |
| 5,868,890 A | 2/1999 | Fredrick |
| 5,900,299 A | 5/1999 | Wynne |
| 5,924,295 A | 7/1999 | Park |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A | 12/2000 | Dietrich |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,294,595 B1 | 9/2001 | Tyagi et al. |
| 6,305,768 B1 | 10/2001 | Nishimoto |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,460,955 B1 | 10/2002 | Vaughan et al. |
| 6,623,413 B1 | 9/2003 | Wynne |
| 6,716,501 B2 | 4/2004 | Kovalchuk et al. |
| 6,736,472 B2 | 5/2004 | Banicevic |

(56) References Cited

U.S. PATENT DOCUMENTS

| | | |
|---|---|---|
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 7,026,054 B2 | 4/2006 | Ikegawa et al. |
| 7,210,308 B2 | 5/2007 | Tanimoto et al. |
| 7,234,247 B2 | 6/2007 | Maguire |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,449,227 B2 | 11/2008 | Echigoya et al. |
| 7,475,562 B2 | 1/2009 | Jackovin |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,703,217 B2 | 4/2010 | Tada et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,861,538 B2 | 1/2011 | Welle et al. |
| 7,886,559 B2 | 2/2011 | Hell et al. |
| 7,893,123 B2 | 2/2011 | Luisi |
| 7,908,873 B1 | 3/2011 | Cur et al. |
| 7,930,892 B1 | 4/2011 | Vonderhaar |
| 7,938,148 B2 | 5/2011 | Carlier et al. |
| 8,113,604 B2 | 2/2012 | Olson et al. |
| 8,117,865 B2 | 2/2012 | Allard et al. |
| 8,163,080 B2 | 4/2012 | Meyer et al. |
| 8,176,746 B2 | 5/2012 | Allard et al. |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,656 B2 | 10/2012 | Allard et al. |
| 8,343,395 B2 | 1/2013 | Hu et al. |
| 8,353,177 B2 | 1/2013 | Adamski et al. |
| 8,528,284 B2 | 9/2013 | Aspenson et al. |
| 8,739,568 B2 | 6/2014 | Allard et al. |
| 8,752,918 B2 | 6/2014 | Kang |
| 8,770,682 B2 | 7/2014 | Lee et al. |
| 8,776,390 B2 | 7/2014 | Hanaoka et al. |
| 8,852,708 B2 | 10/2014 | Kim et al. |
| 8,881,398 B2 | 11/2014 | Hanley et al. |
| RE45,501 E | 5/2015 | Maguire |
| 9,102,076 B2 | 8/2015 | Doshi et al. |
| 9,140,480 B2 | 9/2015 | Kuehl et al. |
| 9,221,210 B2 * | 12/2015 | Wu .................. B29C 51/02 |
| 9,328,951 B2 | 5/2016 | Shin et al. |
| 9,463,917 B2 * | 10/2016 | Wu .................. B29C 51/02 |
| 2002/0168496 A1 | 11/2002 | Morimoto et al. |
| 2003/0008100 A1 | 1/2003 | Horn |
| 2004/0178707 A1 | 9/2004 | Avendano |
| 2004/0180176 A1 | 9/2004 | Rusek |
| 2004/0253406 A1 | 12/2004 | Hayashi et al. |
| 2005/0235682 A1 | 10/2005 | Hirai et al. |
| 2006/0076863 A1 | 4/2006 | Echigoya et al. |
| 2006/0201189 A1 | 9/2006 | Adamski et al. |
| 2006/0263571 A1 | 11/2006 | Tsunetsugu et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0179541 A1 | 7/2009 | Smith et al. |
| 2009/0324871 A1 | 12/2009 | Henn |
| 2010/0170279 A1 | 7/2010 | Aoki |
| 2010/0231109 A1 | 9/2010 | Matzke et al. |
| 2010/0293984 A1 | 11/2010 | Adamski et al. |
| 2010/0295435 A1 | 11/2010 | Kendall et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0315693 A1 | 12/2011 | Cur et al. |
| 2012/0000234 A1 | 1/2012 | Adamski et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCracken |
| 2012/0273111 A1 | 11/2012 | Nomura et al. |
| 2012/0279247 A1 | 11/2012 | Katu et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0033163 A1 | 2/2013 | Kang |
| 2013/0068990 A1 | 3/2013 | Eilbracht et al. |
| 2013/0111941 A1 | 5/2013 | Yu et al. |
| 2013/0255304 A1 | 10/2013 | Cur et al. |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1 | 10/2013 | Wu et al. |
| 2013/0305535 A1 | 11/2013 | Cur et al. |
| 2014/0132144 A1 | 5/2014 | Kim et al. |
| 2014/0171578 A1 | 6/2014 | Meyer et al. |
| 2014/0260332 A1 | 9/2014 | Wu |
| 2014/0346942 A1 | 11/2014 | Kim et al. |
| 2014/0364527 A1 | 12/2014 | Wintermantel et al. |
| 2015/0027628 A1 | 1/2015 | Cravens et al. |
| 2015/0147514 A1 | 5/2015 | Shinohara et al. |
| 2015/0168050 A1 | 6/2015 | Cur et al. |
| 2015/0190840 A1 | 7/2015 | Muto et al. |
| 2016/0240839 A1 | 8/2016 | Umeyama et al. |
| 2016/0258671 A1 | 9/2016 | Allard et al. |

FOREIGN PATENT DOCUMENTS

| | | |
|---|---|---|
| CA | 2640006 A1 | 8/2007 |
| CN | 1158509 A | 4/2002 |
| CN | 100359272 A | 12/2005 |
| CN | 1970185 A | 5/2007 |
| CN | 101437756 A | 5/2009 |
| CN | 201680116 U | 12/2010 |
| CN | 102296714 A | 12/2011 |
| CN | 102452522 A | 5/2012 |
| CN | 102717578 A | 10/2012 |
| CN | 102720277 A | 10/2012 |
| CN | 103072321 A | 5/2013 |
| CN | 203331442 U | 12/2013 |
| CN | 104816478 A | 8/2015 |
| DE | 1150190 B | 6/1963 |
| DE | 4110292 A1 | 10/1992 |
| DE | 19818890 A1 | 11/1999 |
| DE | 19915311 A1 | 10/2000 |
| DE | 102008026528 | 12/2009 |
| DE | 102009046810 | 5/2011 |
| DE | 102010024951 A1 | 12/2011 |
| DE | 102011051178 A1 | 12/2012 |
| DE | 102012223536 A1 | 6/2014 |
| DE | 102012223541 A1 | 6/2014 |
| EP | 0260699 A2 | 3/1988 |
| EP | 0480451 A1 | 4/1992 |
| EP | 0691518 A1 | 1/1996 |
| EP | 0860669 A1 | 8/1998 |
| EP | 1087186 A2 | 3/2001 |

(56) References Cited

FOREIGN PATENT DOCUMENTS

| | | |
|---|---|---|
| EP | 1200785 A1 | 5/2002 |
| EP | 1243880 A1 | 9/2002 |
| EP | 1484563 A1 | 12/2004 |
| EP | 1496322 A1 | 1/2005 |
| EP | 1505359 A1 | 2/2005 |
| EP | 1602425 A1 | 12/2005 |
| EP | 2342511 A2 | 7/2011 |
| EP | 2607073 A2 | 6/2013 |
| EP | 2789951 A1 | 10/2014 |
| FR | 2991698 A1 | 12/2013 |
| FR | 2980963 A1 | 4/2014 |
| GB | 837929 A | 6/1960 |
| GB | 1214548 A | 12/1970 |
| JP | 51057777 | 5/1976 |
| JP | 59191588 | 12/1984 |
| JP | 03013779 A | 1/1991 |
| JP | 06159922 A | 6/1994 |
| JP | 7001479 | 1/1995 |
| JP | H07167377 A | 7/1995 |
| JP | 08300052 | 11/1996 |
| JP | H08303686 A | 11/1996 |
| JP | H09166271 A | 6/1997 |
| JP | 10113983 | 5/1998 |
| JP | 11311395 | 11/1999 |
| JP | 11336990 | 12/1999 |
| JP | 2000097390 | 4/2000 |
| JP | 2000117334 A | 4/2000 |
| JP | 2001038188 A | 2/2001 |
| JP | 2001116437 A | 4/2001 |
| JP | 03478771 | 6/2001 |
| JP | 2001336691 A | 12/2001 |
| JP | 2001343176 | 12/2001 |
| JP | 2004303695 | 10/2004 |
| JP | 2005114015 | 4/2005 |
| JP | 2005164193 | 6/2005 |
| JP | 2005256849 A | 9/2005 |
| JP | 2006077792 A | 3/2006 |
| JP | 2006161945 A | 6/2006 |
| JP | 03792801 B2 | 7/2006 |
| JP | 2006200685 A | 8/2006 |
| JP | 2007263186 A | 10/2007 |
| JP | 4111096 B2 | 7/2008 |
| JP | 2008157431 A | 7/2008 |
| JP | 2009063064 A | 3/2009 |
| JP | 2009162402 A | 7/2009 |
| JP | 2009524570 A | 7/2009 |
| JP | 2010017437 A | 1/2010 |
| JP | 2010071565 A | 4/2010 |
| JP | 2010108199 A | 5/2010 |
| JP | 2010145002 A | 7/2010 |
| JP | 04545126 B2 | 9/2010 |
| JP | 2010236770 A | 10/2010 |
| JP | 2010276309 A | 12/2010 |
| JP | 2011002033 A | 1/2011 |
| JP | 2011069612 A | 4/2011 |
| JP | 04779684 B2 | 9/2011 |
| JP | 2011196644 A | 10/2011 |
| JP | 4828353 B2 | 11/2011 |
| JP | 2012026493 A | 2/2012 |
| JP | 2012063029 A | 2/2012 |
| JP | 04897473 B2 | 3/2012 |
| JP | 2013195009 A | 3/2012 |
| JP | 2012087993 A | 5/2012 |
| JP | 2012163258 A | 8/2012 |
| JP | 2012189114 A | 10/2012 |
| JP | 2012242075 A | 12/2012 |
| JP | 2013002484 A | 1/2013 |
| JP | 2013050212 A | 3/2013 |
| JP | 2013088036 A | 5/2013 |
| KR | 20020057547 | 7/2002 |
| KR | 20020080938 A | 10/2002 |
| KR | 20030083812 A | 11/2003 |
| KR | 20040000126 | 1/2004 |
| KR | 100620025 B1 | 9/2006 |
| KR | 1020070044024 A | 4/2007 |
| KR | 1020080103845 | 11/2008 |
| KR | 20090026045 | 3/2009 |
| KR | 1017776 | 2/2011 |
| KR | 20120007241 | 1/2012 |
| KR | 2012046621 | 5/2012 |
| KR | 2012051305 | 5/2012 |
| RU | 2077411 C1 | 4/1997 |
| RU | 2132522 C1 | 6/1999 |
| RU | 2252377 | 5/2005 |
| RU | 2349618 C2 | 3/2009 |
| RU | 2571031 | 12/2015 |
| SU | 00476407 A1 | 7/1975 |
| SU | 01307186 A1 | 4/1987 |
| WO | 9849506 A1 | 11/1998 |
| WO | 9920964 | 4/1999 |
| WO | 9920964 A1 | 4/1999 |
| WO | 0160598 | 8/2001 |
| WO | 0202987 | 1/2002 |
| WO | 0252208 | 4/2002 |
| WO | 02060576 A1 | 8/2002 |
| WO | 03089729 A1 | 10/2003 |
| WO | 2006045694 | 5/2006 |
| WO | 2007085511 A1 | 8/2007 |
| WO | 2008122483 A2 | 10/2008 |
| WO | 2009013106 A2 | 1/2009 |
| WO | 2009112433 A1 | 9/2009 |
| WO | 2009147106 A1 | 12/2009 |
| WO | 2010007783 A1 | 1/2010 |
| WO | 2010029730 A1 | 3/2010 |
| WO | 2010043009 A2 | 4/2010 |
| WO | 2010092627 A1 | 8/2010 |
| WO | 2010127947 A3 | 2/2011 |
| WO | 2011058678 A1 | 5/2011 |
| WO | 2011003711 A3 | 6/2011 |
| WO | 2011081498 A3 | 11/2011 |
| WO | 2012023705 A3 | 4/2012 |
| WO | 2012026715 A3 | 6/2012 |
| WO | 2012043990 A3 | 6/2012 |
| WO | 2012044001 A3 | 6/2012 |
| WO | 2012119892 A1 | 9/2012 |
| WO | 2012031885 A3 | 1/2013 |
| WO | 2012085212 A9 | 7/2013 |
| WO | 2014038150 A1 | 3/2014 |
| WO | 2014095542 | 6/2014 |
| WO | 2014184393 A1 | 11/2014 |
| WO | 2016082907 A1 | 6/2016 |

OTHER PUBLICATIONS

BASF, "Balindur™," web page, 2 pages, date unknown, http://product-finder.basf.com/group/corporate/product-finder/en/brand/BALINDUR, at least as early as Dec. 21, 2015.

PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.

European Patent Application No. 13775196.2, Supplemental Search Report, Dec. 7, 2015, 10 pages.

European Patent Application No. 14158608.1, Search Report, dated Sep. 30, 2014, 5 pages.

International Patent Application No. PCT/US2013036203, International Search Report, dated Jul. 26, 2013, 10 pages.

European Patent Application No. 15154577.9, Search Report, dated Jul. 20, 2015, 8 pages.

European Patent Application No. 14158619, Search Report, dated Jun. 22, 2015, 9 pages.

European Patent Application No. 15153481, Search Report, dated Jul. 10, 2015, 6 pages.

KitchenAid, "Refrigerator user instructions," Sep. 5, 2015, 120 pages.

International Searching Authority, "Search Report," issued in connection with International Patent Application No. PCT/US2016/062479, dated Feb. 9, 2017, 8 pages.

International Searching Authority, "Search Report," issued in connection with International Patent Application No. PCT/US2016/060947, dated Feb. 2, 2017, 8 pages.

(56) References Cited

OTHER PUBLICATIONS

International Searching Authority, "Search Report," issued in connection with International Patent Application No. PCT/US2016/061125, dated Jan. 12, 2017, 9 pages.
International Searching Authority, "Search Report," issued in connection with International Patent Application No. PCT/US2016/062453, dated Feb. 9, 2017, 8 pages.
International Searching Authority, "Search Report," issued in connection with International Patent Application No. PCT/US2016/061790, dated Jan. 26, 2017, 8 pages.
International Searching Authority, "Search Report," issued in connection with International Patent Application No. PCT/US2016/062029, dated Jan. 26, 2017, 8 pages.
International Searching Authority, "Search Report," issued in connection with International patent Application No. PCT/US2016/060961, dated Feb. 2, 2017, 9 pages.
European Patent Application No. 13775196.2, Supplemental Search Report, dated Dec. 7, 2015, 10 pages.
European Search Report, Application No. EP14158615, dated Jun. 24, 2015, 5 pages.
International Search Report, Application No. PCT/US2016/020896, dated May 12, 2016. 3 pages.
International Search Report, International Application No. PCT/US2016/060519, dated Mar. 16, 2017, 10 pages.
International Search Report, International Application No. PCT/US2016/062804, dated Feb. 27, 2017, 9 pages.
International Search Report, International Application No. PCT/US2016/063023, dated Mar. 30, 2017, 7 pages.
International Search Report, International Application No. PCT/US2016/063065, dated Apr. 20, 2017, 9 pages.
International Search Report, International Application No. PCT/US2016/063355, dated Feb. 27, 2017, 9 pages.
International Search Report, International Application No. PCT/US2016/063958, dated Mar. 6, 2017, 10 pages.

* cited by examiner

*(TRADITIONAL REFRIGERATOR CABINET CONSTRUCTION)*

*(TRADITIONAL REFRIGERATOR CABINET CONSTRUCTION)*

*(TRADITIONAL REFRIGERATOR CABINET CONSTRUCTION)*

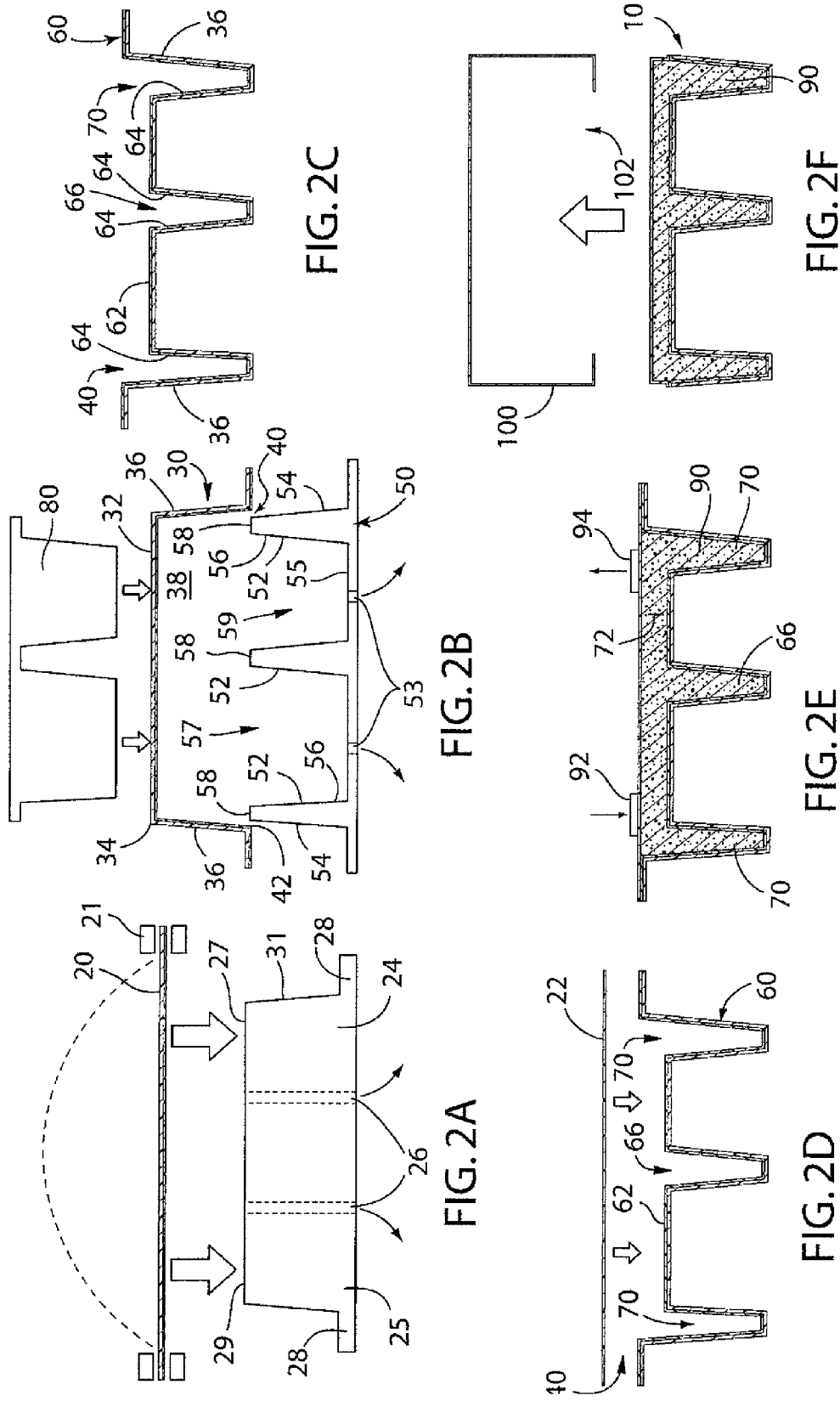

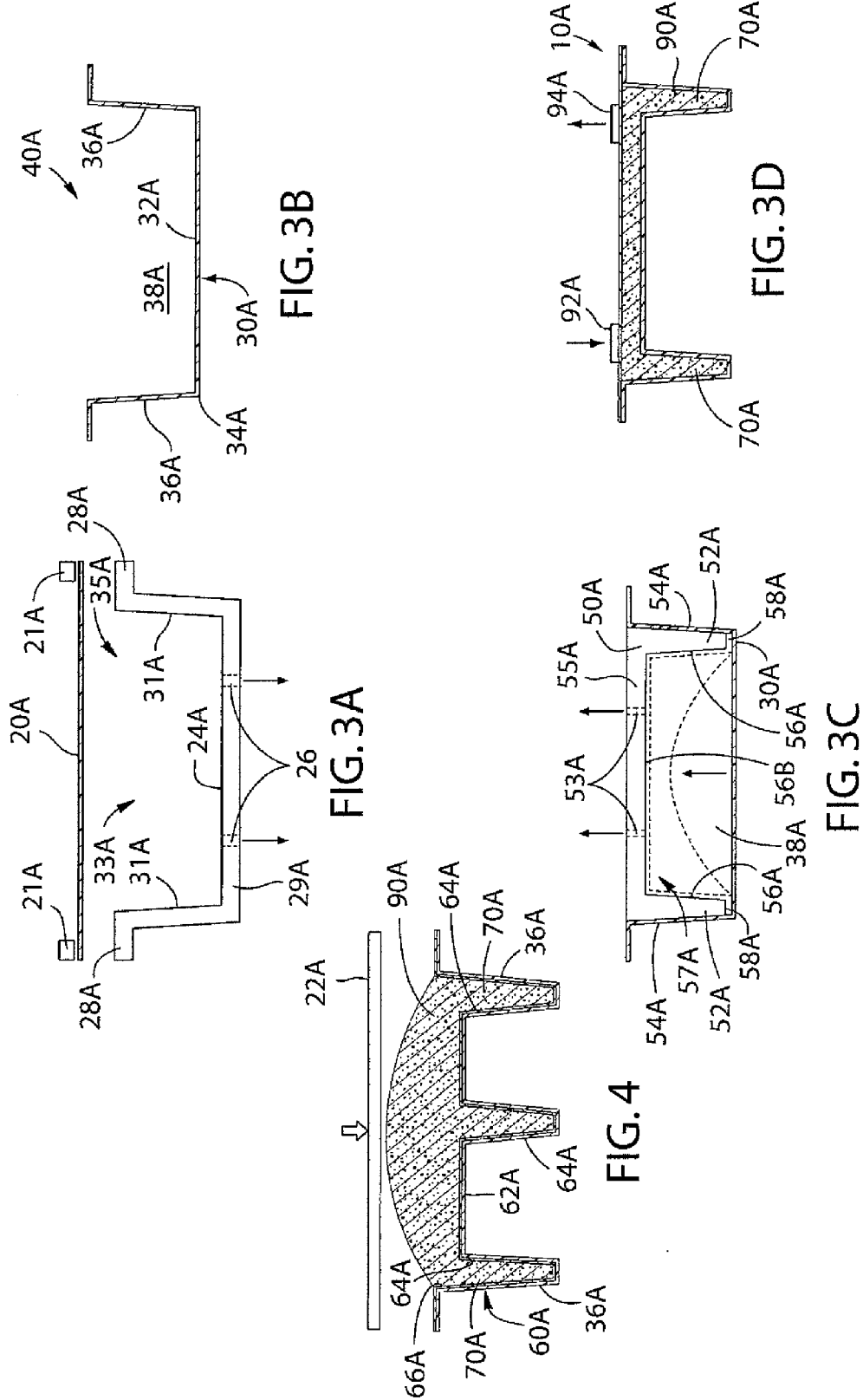

METHOD TO CREATE VACUUM INSULATED CABINETS FOR REFRIGERATORS

CROSS-REFERENCE TO RELATED APPLICATIONS

The present application is a continuation of U.S. Pat. No. 9,463,917 issued Oct. 11, 2016, entitled "METHOD TO CREATE VACUUM INSULATED CABINETS FOR REFRIGERATORS," which is a continuation of U.S. patent application No. 9,221,210, issued Dec. 29, 2015, entitled "METHOD TO CREATE VACUUM INSULATED CABINETS FOR REFRIGERATORS," which claims the benefit of U.S. Provisional Application Ser. No. 61/622,821, filed Apr. 11, 2012, entitled "VACUUM INSULATED CABINETS FOR HOUSEHOLD REFRIGERATORS." The entire disclosure of each application listed above is hereby incorporated by reference.

The present application is related to U.S. patent application Ser. No. 13/833,635, filed Mar. 15, 2013, entitled "A METHOD TO CREATE VACUUM INSULATED CABINETS FOR REFRIGERATORS"; and U.S. Pat. No. 9,140,481, issued Sep. 22, 2015, entitled "FOLDED VACUUM INSULATED STRUCTURE"; and U.S. Pat. No. 8,944,541, issued Feb. 3, 2015, entitled "A VACUUM PANEL CABINET STRUCTURE FOR A REFRIGERATOR"; and U.S. Pat. No. 9,185,158 issued Nov. 10, 2015, entitled "DUAL COOLING SYSTEMS TO MINIMIZE OFF-CYCLE MIGRATION LOSS IN REFRIGERATORS WITH A VACUUM INSULATED STRUCTURE"; and U.S. Pat. No. 9,038,403, issued May 26, 2015, entitled "VACUUM INSULATED DOOR STRUCTURE AND METHOD FOR THE CREATION THEREOF"; and U.S. Pat. No. 9,071,907, issued Jun. 30, 2015, entitled "VACUUM INSULATED STRUCTURE TUBULAR CABINET CONSTRUCTION"; and U.S. Pat. No. 8,986,483, issued Mar. 24, 2015, entitled "METHOD OF MAKING A FOLDED VACUUM INSULATED STRUCTURE"; and U.S. Pat. No. 9,221,210, issued Dec. 29, 2015, entitled "METHOD TO CREATE VACUUM INSULATED CABINETS FOR REFRIGERATORS", all of which are incorporated herein by reference in their entirety.

FIELD OF THE INVENTION

The present invention generally relates to a vacuum insulated cabinet and the method for constructing therefore.

BACKGROUND OF THE INVENTION

Known plastic liner forming processes, as shown in traditional refrigerator cabinet construction FIGS. 1A-1C, the plastic sheet does not have an impermeable layer to provide a sufficient barrier for a vacuum insulated cabinet. In current refrigerator cabinet versions an manufacturing an insulated refrigerator cabinet, as shown in FIGS. 1A-1C, a material sheet 12 having a single layer plastic is thermoformed over a first forming tool 11 to create a first intermediate structure 15. A steel sheet wrapper 13 is then fitted over the first intermediate structure 15 to create an annular space 16. The annular space 16 is filled with insulation material 14 by any conventional means. The current insulation used in the refrigerator cabinet is polyurethane foam blown into the cavity between the plastic liner and the metal wrapper.

SUMMARY OF THE INVENTION

One aspect of the present invention includes a method of forming a vacuum insulated refrigerator cabinet providing first and second sheets of material comprising at least a first layer of thermal plastic material that is at least partially permeable to nitrogen and oxygen and the second layer of material that is substantially impermeable to oxygen, nitrogen and water vapor. At least a portion of the first sheet of material is heated to a temperature at which the first sheet of material can be plastically deformed. A first forming tool is utilized to deform the first sheet of material and form a first intermediate structure having a base sidewall defining a generally quadrilateral perimeter and four first sidewalls extending transversely from the quadrilateral perimeter to define a cavity having an opening that opens in a first direction and defines a peripheral edge extending around the opening. A second forming tool is provided having sidewall portions defining four generally rectangular outwardly facing surfaces and four generally rectangular inwardly facing surfaces, and an end surface extending transversely between the inwardly and outwardly facing surfaces. The first intermediate structure is disengaged from the first forming tool followed by positioning the second forming tool into the cavity of the first intermediate structure. The base sidewalls are plastically deformed to form a second intermediate structure having a base sidewall and four inner sidewalls extending transversely from the base sidewall and defining a second cavity that opens in a second direction that is substantially opposite the first direction. The inner sidewalls are spaced apart inwardly from the first sidewalls to define an annular space that opens in the first direction. The second sheet of material is sealingly connected to the second intermediate structure around the peripheral edge to substantially close off the opening. A vacuum is formed in the annular space with an appropriate porous, thermally insulating material such as fumed silica compacted and placed in the annular space to withstand atmospheric pressure and to provide superior thermal insulation properties.

Another aspect of the present invention includes a method of forming a vacuum insulated refrigerator cabinet providing first and second sheets of material comprising at least a first layer of thermoplastic material and a second layer of material. At least a portion of the first sheet of material is heated to a temperature at which the first sheet of material can be plastically deformed. A first forming tool is utilized to deform the first sheet of material and form a first intermediate structure having the base sidewall defining a generally quadrilateral perimeter and at least one first side wall extending transversely from the quadrilateral perimeter to define a cavity having an opening that opens in a first direction and defines a peripheral edge extending around the opening. A second forming tool is provided having sidewall portions defining a plurality of generally rectangular outwardly facing surfaces and a plurality of generally rectangular inwardly facing surfaces, and an end surface extending transversely between the inwardly and outwardly facing surfaces. The first intermediate part is disengaged from the first forming tool followed by positioning the second forming tool in the cavity of the first intermediate structure. The base sidewall is plastically deformed to form a second intermediate structure having a base sidewall and a plurality of inner sidewalls extending transversely from the base sidewall and defining a second cavity that opens in a second direction that is substantially opposite the first direction. The inner sidewalls are spaced apart inwardly from the first sidewalls to define an annular space that opens in the first direction. The second sheet of material is sealingly connected to the second intermediate structure around the peripheral edge in order to substantially close off the opening. A vacuum is formed in the annular space with an appropriate porous, thermally insulating material such as fumed silica compacted and placed in the annular space to withstand atmospheric pressure and to provide superior thermal insulation properties.

Yet another aspect of the present invention includes the method for forming a vacuum insulated refrigerator cabinet providing first and second sheets of material comprising at least a first layer of thermal plastic material that is at least partially permeable to oxygen, nitrogen and water vapor, and a second layer of material that is substantially impermeable to oxygen, nitrogen and water vapor. At least a portion of the first sheet of material is heated to a temperature at which the first sheet of material can be plastically deformed. A first forming tool is utilized to deform the first sheet of material and form a first intermediate structure which defines a cavity having an opening that opens in a first direction and defines a peripheral edge extending around the opening. A second forming tool is also provided. The first intermediate part is disengaged from the first forming tool followed by positioning the second forming tool in the cavity of the first intermediate structure. A base sidewall is plastically deformed in order to form a second intermediate structure having a base sidewall and a plurality of inner sidewalls extending transversely from the base sidewall and defining a second cavity that opens in the second direction substantially opposite the first direction. The inner sidewalls are spaced apart inwardly from the first sidewalls to define an annular space that opens in the first direction. The second sheet of material is sealingly connected to the intermediate structure around the peripheral edge in order to substantially close off the opening. A vacuum is formed in the annular space with an appropriate porous, thermally insulating material such as fumed silica compacted and placed in the annular space to withstand atmospheric pressure and to provide superior thermal insulation properties.

These and other features, advantages, and objects of the present invention will be further understood and appreciated by those skilled in the art by reference to the following specification, claims, and appended drawings.

Figure 1A:
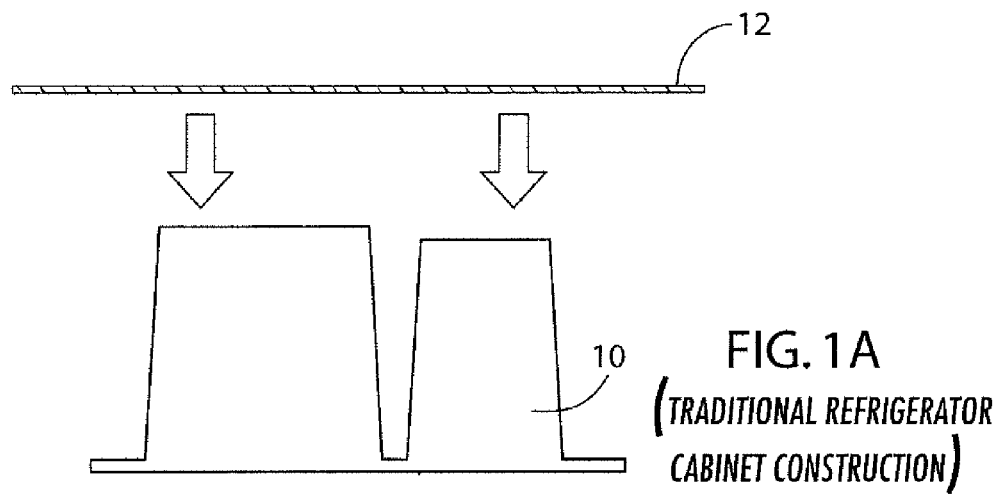
FIG. 1A is a side plan view of a prior art version of a vacuum insulated cabinet.
Figure 1B:
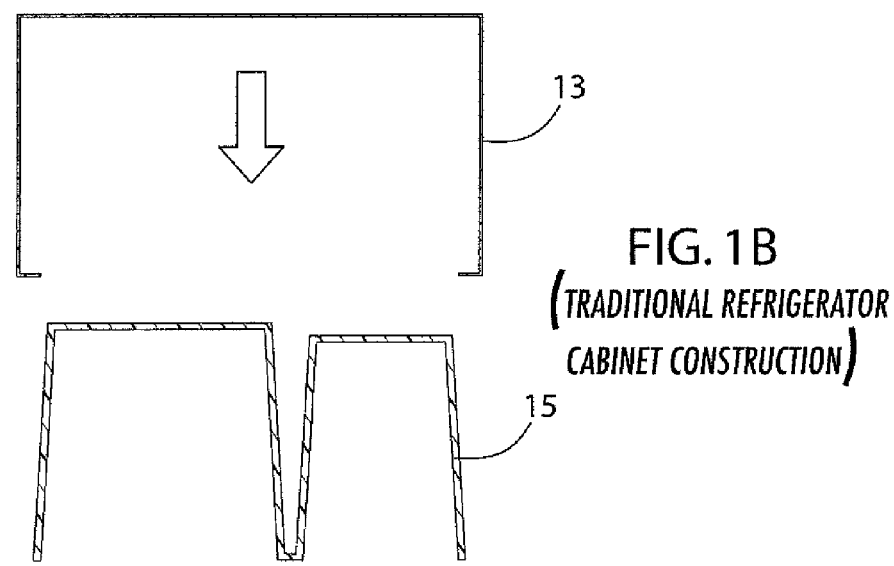
FIG. 1B is a side plan view of a prior art version of a vacuum insulated.
Figure 1C:
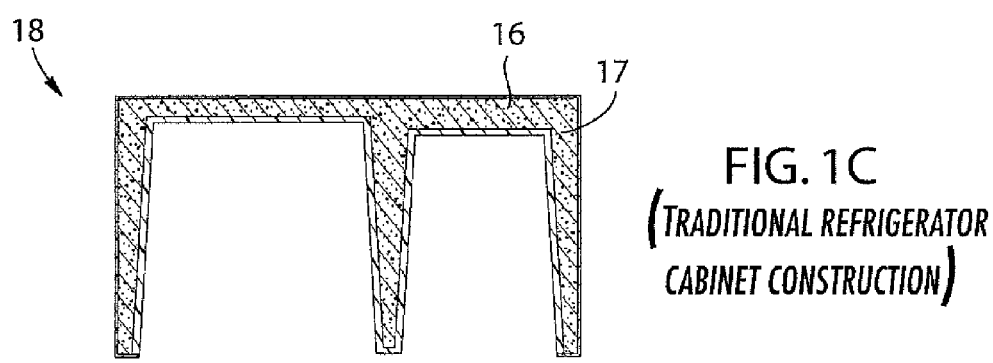

cabinet;

FIG. 1C is a side plan view of prior art version of a vacuum insulated refrigerator cabinet;

FIG. 2A is a side plan view of a method according to the present invention;

FIG. 2B is a side plan view of the method of the present invention;

FIG. 2C is a side plan view of the method of the present invention;

FIG. 2D is a side plan view of the method of the present invention;

FIG. 2E is a side plan view of the method of the present invention;

FIG. 2F is a side plan view of the method of the present invention;

FIG. 3A is a side plan view of another embodiment of the present invention;

FIG. 3B is a side plan view of the method of the present invention shown in FIG. 3A;

FIG. 3C is a side plan view of the method of the present invention shown in FIG. 3A;

FIG. 3D is a side plan view of the method of the present invention shown in FIG. 3A; and FIG. 4 is a side plan view of yet another embodiment of the method of the present invention.

DETAILED DESCRIPTION

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

FIGS. 2A-2F show a method of forming a vacuum insulated cabinet 10 according to the present invention. FIG. 2A shows a first forming tool 24 having a generally quadrilateral perimeter formed from a base wall 29 and a plurality of sidewalls 31 with two extending flanges 28 configured to extend from a bottom portion 25 of the quadrilateral perimeter. The first forming tool 24 may further include at least one vacuum channel 26. FIG. 2A also shows a first material sheet 20. The first material sheet 20 is typically comprised of a first layer of thermoplastic material that is partially permeable to oxygen, nitrogen and water vapor and a second layer of material that is substantially impermeable to oxygen, nitrogen and water vapor. A typical plastic composite used in this process is a first layer of high impact polystyrene (HIPS) food grade, specially tailored for refrigeration products and a second impermeable layer of EVOH. One exemplary embodiment uses Polystyrol 2710 by BASF and Edistr RR740E by Polimeri Europa as the first layer.

The first material sheet 20 is first softened typically using heat until the first material sheet 20 reaches a temperature at which the first material sheet 20 can be plastically deformed. Typically, the first material sheet 20 is deformed into a semi-circle like shape typically formed by blowing air centrally on the first material sheet 20 while the first material sheet 20 has its edges clamped down to hold the edges in place, as shown in the dashed lines in FIG. 2A. The first material sheet 20 is then lowered onto a top perimeter 27 of the first forming tool 24. The edges of the first material sheet 20 are configured to be clamped onto the flanges 28 of the first forming tool 24. The flanges 28 are typically comprised of the sidewalls 31 of the first forming tool 24. A vacuum is then used to thermoform the first material sheet 20 over the first forming tool 24 to form the first intermediate structure 30 (shown in FIG. 2B).

Next, as shown in FIG. 2B, the first intermediate structure 30 is aligned over a second forming mold 50. As also shown in FIG. 2B, the first intermediate structure 30 has a base sidewall 32 defining a generally quadrilateral perimeter 34 and a plurality of first sidewalls 36, typically four sidewalls, extending transversely from the quadrilateral perimeter 34 in order to define a cavity 38 which has an opening 40 that opens in a first direction and defines a peripheral edge 42 extending around the opening 40. The opening 40 of the cavity 38 of the first intermediate structure 30 is aligned with a second forming tool 50. The second forming tool 50 is typically comprised of sidewall portions 52 which define a plurality of generally rectangular outwardly facing surfaces 54 and a plurality of generally rectangular inwardly facing surfaces 56, and at least one end surface 58 extending transversely between the inwardly 56 and outwardly 54 facing surfaces. Again, the second forming tool 50 includes vacuum holes 53, to help form the first intermediate structure 30 onto the second forming tool 50 in order to produce the second intermediate structure 60.

As shown in FIG. 2B, the first intermediate structure 30 is heated to a temperature at which it can plastically deform. The first intermediate structure 30 is then formed over the second forming mold 50 using vacuum holes 53 to help form the second intermediate structure 60. Optionally, a third forming tool 80 may be utilized. The third forming tool 80 is configured to engage the second forming tool 50 in order to help form the second intermediate structure 60. The third forming tool 80 is typically an opposite version of the second forming tool 50. For example, if the second forming tool 50 is a female mold, the third forming tool 80 is a corresponding male mold, and vice versa.

FIG. 2C shows the second intermediate structure 60. The second intermediate structure 60 typically includes a base sidewall 62 and a plurality of inner sidewalls 64 extending transversely from the base sidewall 62 and defining a second cavity 66 that opens in a second direction that is substantially opposite the first direction. The inner sidewalls 64 are spaced apart inwardly from the first sidewalls 62 to define an annular space 70 that opens in the first direction. Next, a second material sheet 22 is sealingly connected to the second intermediate structure 60. The second material sheet 22 is extended across the peripheral edge of the second intermediate structure 60 in order to substantially close off the opening 68 of the second intermediate structure 60 and form an annular space 70. As shown in FIG. 2E, the porous insulation material 90 is typically inserted and compacted to a density to withstand atmospheric pressure into the annular space 70 through at least one opening hole 92 typically located on the second material sheet 22. Additionally, the second material sheet 22 may have additional holes 94 in order to let air exit out of the annular space 70. Alternatively, the pre-formed and compacted insulation material 90 may be inserted into the annular space 70 of the second intermediate structure 60 prior to the sealing of the second material sheet 22. Once the insulation material 90 is inserted and the second material sheet 22 is sealingly connected to the second intermediate structure 60, a vacuum is used, typically in holes 92 and 94, in order to form a vacuum within the annular space 70 and sealed to produce a vacuum insulated cabinet 10. Moreover, as shown in FIG. 2F, a sheet wrapper 100 may optionally be disposed over the vacuum insulated structure 10 in order to provide additional structural support. The sheet wrapper 100 is typically comprised of steel and is generally quadrilateral in shape having an opening 102 on one side configured to receive the vacuum insulated cabinet 10.

FIGS. 3A-3D show an alternate embodiment of the present invention. FIG. 3A shows a first forming tool 24 having a base sidewall 29 defining a generally quadrilateral perimeter and a plurality of sidewalls 31 extending transversely from the quadrilateral perimeter in order to define a cavity 33 having an opening 35 that opens in a second direction. As shown in FIGS. 2A and 3A, the first forming tool 24 may be a male or a female type mold structure. The first material sheet 20 is plastically deformed through heating the first material sheet 20 which allows the first material sheet 20 to form a first intermediate structure 30 utilizing the first forming tool 24. Edges of the first material sheet 20 are clamped to the flanges 28 or transversely extending sidewalls 31 in order to form the first intermediate structure 30. Once the first intermediate structure 30 is formed, it typically comprises a base sidewall 32 defining a generally quadrilateral perimeter 34 and a plurality of sidewalls 36 extending transversely from the quadrilateral perimeter 34 in order to define a cavity 38 having an opening 40 that opens in the second direction.

Next, a second forming tool 50 is disposed inside of the cavity 38 of the first intermediate structure 30. The second forming tool 50 typically has sidewall portions 52 defining a plurality of generally rectangular outwardly facing surfaces 54 and inwardly facing surfaces 56 and at least one end surface 58 extending transversely between the inwardly 56 and outwardly 54 facing surfaces. Moreover, the second forming tool 50 includes a cavity 57 defined by the at least one base sidewall 55 and plurality of inner sidewalls 64 extending transversely from the base wall 55 defining a second cavity 59 that opens in the first direction. Once the second forming tool 50 is engaged with the first intermediate structure 30, the first intermediate structure 30 is plastically deformed using a vacuum system to produce a second intermediate structure 60. The second intermediate structure 60 typically has a base wall 62 and inner sidewalls 64 extending transversely from the base wall 62 defining a second cavity 68 that opens in the first direction and the inner sidewalls 64 are spaced apart inwardly from the first sidewall 62 in order to define an annular space 70. In the embodiment shown in FIGS. 3A-3DD, the second forming tool 50 is comprised of pre-formed and compacted highly porous insulation material 90. The insulation material 90 is configured to be solid enough to withstand atmospheric pressure when evacuated and to allow the first intermediate structure 30 to be formed over the insulation material 90 to produce the second intermediate structure 60. In the embodiment shown in FIG. 3C, the second forming tool 50 remains within the annular space 70, and is sealed inside by the second material sheet 22. The second material sheet 22 is sealingly connected to the second intermediate structure 60 around an edge of the base sidewall 62 of the second intermediate structure 60. As shown in FIG. 3D, air can then be evacuated from the structures shown in FIG. 3C in order to produce a vacuum insulated cabinet 10.

As shown in FIG. 4, the insulation material 90 may be inserted into the second intermediate structure prior to the covering of the structure 60 with the second material sheet 22. The insulation material 90 may be inserted in such a way that forms a semi-circle shape rising above the cavity 66 in the second intermediate structure. The second material sheet 22 is configured to compact the insulation material 90 to a desired compaction level during the sealing process. The addition and compaction steps can be repeated as desired to reach the desired compaction level of the insulation material 90 to withstand atmospheric pressure when the annular cavity is which contains material 90 is evacuated. The insulation material 90 is typically a highly porous granular insulation such as fumed silica or an open cell polyurethane foam or may be any other insulation material 90 known to one of ordinary skill in the art. Any ambient air is then evacuated from the annular space 70 forming a vacuum insulated cabinet 10. The processes described above result in less thinning of the first 20 and second 22 material sheet in order to ensure that the first material sheet 20 and the second material sheet 22 remain intact in order to provide a vacuum insulated structure.

The invention claimed is:

1. A method of forming a vacuum insulated refrigerator cabinet, the method comprising:
providing a first sheet of material comprising at least a first layer of thermoplastic material that is at least partially permeable to oxygen, nitrogen and water vapor, and a second layer of material that is substantially impermeable to oxygen, nitrogen and water vapor;
heating at least a portion of the first sheet of material to a temperature at which the first sheet of material can be plastically deformed;
applying a first force to the first sheet of material to form four first sidewalls extending transversely from a central portion of the first sheet of material;
applying a second force to the first sheet to form a base sidewall and four inner sidewalls extending transversely from the base sidewall in a first direction, and a transverse end wall interconnecting the first sidewalls and the inner sidewalls to define an annular space that opens in the first direction, and wherein the base sidewall and the inner sidewalls define a refrigerator cavity that opens in a second direction that is substantially opposite the first direction;
securing a second sheet of material to the first sheet of material to close off the annular space;
filling the annular space with porous material; and
forming a vacuum in the annular space containing the porous material.

2. The method of claim 1, wherein:
the first force is applied in the first direction, and:
the second force is applied in the second direction.

3. The method of claim 1, including:
utilizing a first tool to apply the first force; and
utilizing a second tool to apply the second force.

4. The method of claim 3, wherein:
the first tool is utilized to form a first intermediate structure having a cavity defined by the first sidewalls and a base sidewall.

5. The method of claim 4, wherein:
the second forming tool includes sidewall portions defining outwardly facing surfaces, inwardly facing surfaces, and an end surface extending between the inwardly and outwardly facing surfaces; and including:
disengaging the first intermediate structure from the first forming tool, followed by positioning the second forming tool in the cavity of the first intermediate structure.

6. The method of claim 5, wherein:
the second sheet of material is spaced apart from the base sidewall to form a central space that is connected to the annular space.

7. The method of claim 4, wherein:
the second forming tool comprises compacted porous insulation material; and
at least a portion of the second forming tool is disposed in the cavity while a vacuum is formed in the space.

8. The method of claim 3, wherein;
the base sidewall has a quadrilateral perimeter; and including:
forming the four inner sidewalls to extend transversely from the base sidewall.

9. The method of claim 4, wherein;
the inwardly facing surfaces of the second forming tool are rectangular; and
the outwardly facing surfaces of the second forming tool are rectangular.

10. A method of forming a vacuum insulated refrigerator cabinet, the method comprising:
providing first and second sheets of material wherein the first sheet comprises at least a first layer of thermoplastic material that is at least partially permeable to oxygen, nitrogen and water vapor, and a second layer of material that is substantially impermeable to oxygen, nitrogen and water vapor;
heating at least a portion of the first sheet of material to a temperature at which the first sheet of material can be plastically deformed;
utilizing a first forming tool to deform the first sheet of material and form a first intermediate structure having a base sidewall and a first sidewall extending transversely from the base sidewall to define a cavity having an opening that opens in a first direction and defines a peripheral edge extending around the opening;
plastically deforming the base sidewall utilizing a second forming tool to form a second intermediate structure having a base sidewall and an inner sidewall extending transversely from the base sidewall, wherein the inner sidewall is spaced apart inwardly from the first sidewall to define a space;
at least partially filling the space with a porous material;
sealingly connecting the second sheet of material to the second intermediate structure around the peripheral edge to substantially close off the opening; and
forming a vacuum in the space containing the porous material.

11. The method of claim 10, wherein:
the second forming tool includes sidewall portions defining a plurality of outwardly facing surfaces and a plurality of inwardly facing surfaces, and at least one end surface extending between the inwardly and outwardly facing surfaces; and including:
disengaging the first intermediate structure from the first forming tool, followed by positioning the second forming tool in the cavity of the first intermediate structure.

12. The method of claim 10, wherein:
the space defined by the first sidewall and the inner sidewall comprises an annular space;
the second sheet of material is spaced apart from the base sidewall of the second intermediate structure to form a central space that is connected to the annular space.

13. The method of claim 10, wherein:
the second forming tool comprises the porous insulating material; and including:
positioning at least a portion of the second forming tool in the cavity while a vacuum is formed in the space.

14. The method of claim 10, wherein;
the first forming tool includes at least one vacuum channel and including:
causing gas to flow through the at least one vacuum channel.

15. The method of claim 10, wherein;
the first forming tool is a male mold having a top perimeter; and including:
bringing the top perimeter into contact with the first sheet of material.

16. A method of forming a vacuum insulated refrigerator cabinet, the method comprising:
providing first and second sheets of material;
heating and plastically deforming the first sheet of material to form a first intermediate structure having a base sidewall and a first sidewall extending transversely from the base sidewall to define a cavity having an opening, the first sidewall defining a peripheral edge extending around the opening;
plastically deforming the first intermediate structure to form a second intermediate structure having a base sidewall and an inner sidewall extending transversely from the base sidewall, wherein the inner sidewall is spaced apart from the first sidewall to define a space;
sealingly connecting the second sheet of material to the second intermediate structure around the peripheral edge to substantially close off the opening;
filling the space with a porous material; and
forming a vacuum in the space.

17. The method of claim 16, including:
Utilizing a first forming tool to deform the first sheet to form the first intermediate structure;
providing a second forming tool having sidewall portions defining a plurality of outwardly facing surfaces and a plurality of inwardly facing surfaces, and at least one end surface extending transversely between the inwardly and outwardly facing surfaces;
disengaging the first intermediate structure from the first forming tool, followed by positioning the second forming tool in the cavity of the first intermediate structure.

18. The method of claim 16, wherein:
the first and second sheets of material comprise a thermoplastic material and an impermeable material that is substantially impermeable to oxygen, nitrogen and water vapor; and including:
heating at least a portion of the first sheet of material to a temperature at which the first sheet of material can be plastically deformed.

19. The method of claim 16, wherein;
the first sidewall is formed to include a plurality of first sidewalls;
the inner sidewall is formed to include a plurality of inner sidewalls; and
the space comprises an annular space.

20. The method of claim 16, including:
plastically deforming the first intermediate structure to form an end wall extending transversely between the first sidewall and the inner sidewall.

\* \* \* \* \*